US012621571B2

(12) United States Patent
Li et al.

(10) Patent No.: US 12,621,571 B2
(45) Date of Patent: May 5, 2026

(54) CAMERA-TO-CAMERA TRANSFORMATION USING MULTIPLE REGION MATCHING AND BUNDLE ADJUSTMENT

(71) Applicant: GM Global Technology Operations LLC, Detroit, MI (US)

(72) Inventors: Binbin Li, Columbus, OH (US); Xinyu Du, Oakland Township, MI (US); Yao Hu, Sterling Heights, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 430 days.

(21) Appl. No.: 18/169,352

(22) Filed: Feb. 15, 2023

(65) Prior Publication Data

US 2024/0276100 A1 Aug. 15, 2024

(51) Int. Cl.
| | |
|---|---|
| *H04N 23/695* | (2023.01) |
| *G06T 7/11* | (2017.01) |
| *G06V 10/25* | (2022.01) |
| *G06V 10/44* | (2022.01) |
| *G06V 10/56* | (2022.01) |
| *G06V 10/74* | (2022.01) |

(52) U.S. Cl.
CPC ............. *H04N 23/695* (2023.01); *G06T 7/11* (2017.01); *G06V 10/25* (2022.01); *G06V 10/44* (2022.01); *G06V 10/56* (2022.01); *G06V 10/761* (2022.01); *G06T 2207/10024* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 9,866,820 B1 * | 1/2018 | Agrawal | .............. | H04N 13/239 |
| 10,249,052 B2 * | 4/2019 | Cohen | ..................... | G06T 7/593 |
| 11,734,527 B1 * | 8/2023 | Bazin | ................. | G06K 7/10722 |
| | | | | 235/462.11 |
| 12,266,215 B2 * | 4/2025 | Hua | ....................... | G06F 18/214 |
| 2015/0332446 A1 * | 11/2015 | Wang | ...................... | B60R 11/04 |
| | | | | 348/37 |
| 2017/0136948 A1 * | 5/2017 | Sypitkowski | .......... | H04N 5/265 |

* cited by examiner

*Primary Examiner* — James M Anderson, II
(74) *Attorney, Agent, or Firm* — CANTOR COLBURN LLP

(57) ABSTRACT

A vehicle, system and method of aligning a first camera of the vehicle with a second camera of the vehicle. The system includes a processor configured to detect a first set of features in a first image obtained from the first camera, detect a second set of features in a second image obtained from the second camera, determine a first region of interest in the first image, determine a second region of interest in the second image, generate a feature pair by matching the first set of features to the second set of features using the first region of interest and the second region of interest, align the first camera with the second camera using the feature pair, and control an operation at the vehicle based on the alignment between the first camera and the second camera.

20 Claims, 10 Drawing Sheets

CAMERA-TO-CAMERA TRANSFORMATION USING MULTIPLE REGION MATCHING AND BUNDLE ADJUSTMENT

INTRODUCTION

The subject disclosure relates to alignment of cameras in vehicles and, in particular, to a system and method for aligning the coordinate system of cameras using matching regions of interest and matched feature pairs within images from the cameras.

Cameras are used on a vehicle to provide information about the surrounding environment that can be used for various operations of the vehicle, such as for planning a motion or trajectory of the vehicle. When multiple cameras are used, images taken from two different cameras can provide conflicting or confusing data if their coordinate systems do not coincide or are not coordinated with each other. Images from fish-eye cameras include optical aberrations that make it difficult to coordinate the cameras using the images. Accordingly, it is desirable to provide a system and method for determining a transformation between cameras having images that include these optical aberrations.

SUMMARY

In one exemplary embodiment, a method of aligning a first camera of a vehicle with a second camera of the vehicle is disclosed. A first set of features is detected in a first image obtained from the first camera. A second set of features is detected in a second image obtained from the second camera. A first region of interest is determined in the first image. A second region of interest is determined in the second image. A feature pair is generated by matching the first set of features to the second set of features using the first region of interest and the second region of interest. The first camera is aligned with the second camera using the feature pair. An operation at the vehicle is controlled based on the alignment between the first camera and the second camera.

In addition to one or more of the features described herein, the method further includes generating the feature pair by minimizing a cost function based on the first set of features, the second set of features, the first region of interest and the second region of interest. Minimizing the cost function includes minimizing at least one of a descriptor distance for the feature pair, a difference in color of a first pixel in the first image and a second pixel in the second image, the first pixel and the second pixel associated with the feature pair, and a difference in a number of features in given segmented region of the first region of interest and the second region of interest. The method further includes determining transformation matrix between the first camera and the second camera using the feature pairs. The method further includes storing the feature pair in a queue and retrieving the feature pair from the queue using a sliding window. The method further includes defining the first region of interest in the first image and the second region of interest in the second image, the first region of interest corresponding to the second region of interest, detecting the first set of features and determining a first set of segmented regions within the first region of interest, and detecting the second set of features and determining a second set of segmented regions within the second region of interest. Defining the first region of interest and the second region of interest includes one of retrieving the first region of interest and the second region of interest from memory, wherein the first region of interest and the second region of interest are manually defined, defining a polygon in a volume of space, and locating the first region of interest in the first image and the second region of interest in the second image based on the polygon, defining the first region of interest in the first image and obtaining the second region of interest in the second image using a homography transformation, and defining at least one of the region of interest and the second region of interest by selecting a segmentation region.

In another exemplary embodiment, a system for aligning a first camera of a vehicle with a second camera of the vehicle is disclosed. The system includes a processor configured to detect a first set of features in a first image obtained from the first camera, detect a second set of features in a second image obtained from the second camera, determine a first region of interest in the first image, determine a second region of interest in the second image, generate a feature pair by matching the first set of features to the second set of features using the first region of interest and the second region of interest, align the first camera with the second camera using the feature pair, and control an operation at the vehicle based on the alignment between the first camera and the second camera.

In addition to one or more of the features described herein, the processor is further configured to generate the feature pair by minimizing a cost function based on the first set of features, the second set of features, the first region of interest and the second region of interest. The processor is further configured to minimize the cost function includes minimizing at least one of a descriptor distance for the feature pair, a difference in color of a first pixel in the first image and a second pixel in the second image, the first pixel and the second pixel associated with the feature pair, and a difference in a number of features in given segmented region of the first region of interest and the second region of interest. The processor is further configured to determine a transformation matrix between the first camera and the second camera using the feature pairs. The processor is further configured to store feature pair in a queue and retrieve the feature pair from the queue using a sliding window. The processor is further configured to define the first region of interest in the first image and the second region of interest in the second image, the first region of interest corresponding to the second region of interest, detect the first set of features and determining a first set of segmented regions within the first region of interest, and detect the second set of features and determining a second set of segmented regions within the second region of interest. The processor is further configured to define the first region of interest and the second region of interest by performing one of retrieving the first region of interest and the second region of interest from memory, wherein the first region of interest and the second region of interest are manually defined, defining a polygon in a volume of space, and locating the first region of interest in the first image and the second region of interest in the second image based on the polygon, defining the first region of interest in the first image and obtaining the second region of interest in the second image using a homography transformation, and defining at least one of the region of interest and the second region of interest by selecting a segmentation region.

In yet another exemplary embodiment, a vehicle is disclosed. The vehicle includes a first camera, a second camera, and a processor. The processor is configured to detect a first set of features in a first image obtained from the first camera, detect a second set of features in a second image obtained from the second camera, determine a first region of interest in the first image, determine a second region of interest in the second image, generate a feature pair by matching the first set of features to the second set of features using the first set of segmented regions and the second set of segmented regions, align the first camera with the second camera using the feature pair, and control an operation at the vehicle based on the alignment between the first camera and the second camera.

In addition to one or more of the features described herein, the processor is further configured to generate the feature pair by minimizing a cost function based on the first set of features, the second set of features, the first region of interest and the second region of interest. The processor is further configured to minimize the cost function includes minimizing at least one of a descriptor distance for the feature pair, a difference in color of a first pixel in the first image and a second pixel in the second image, the first pixel and the second pixel associated with the feature pair, and a difference in a number of features in given segmented region of the first region of interest and the second region of interest. The processor is further configured to determine a transformation matrix between the first camera and the second camera using the feature pairs. The processor is further configured to store the feature pair in a queue and retrieve the feature pair from the queue using a sliding window. The processor is further configured to define the first region of interest in the first image and the second region of interest in the second image, the first region of interest corresponding to the second region of interest, detect the first set of features and determine a first set of segmented regions within the first region of interest, and detect the second set of features and determining a second set of segmented regions within the second region of interest.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
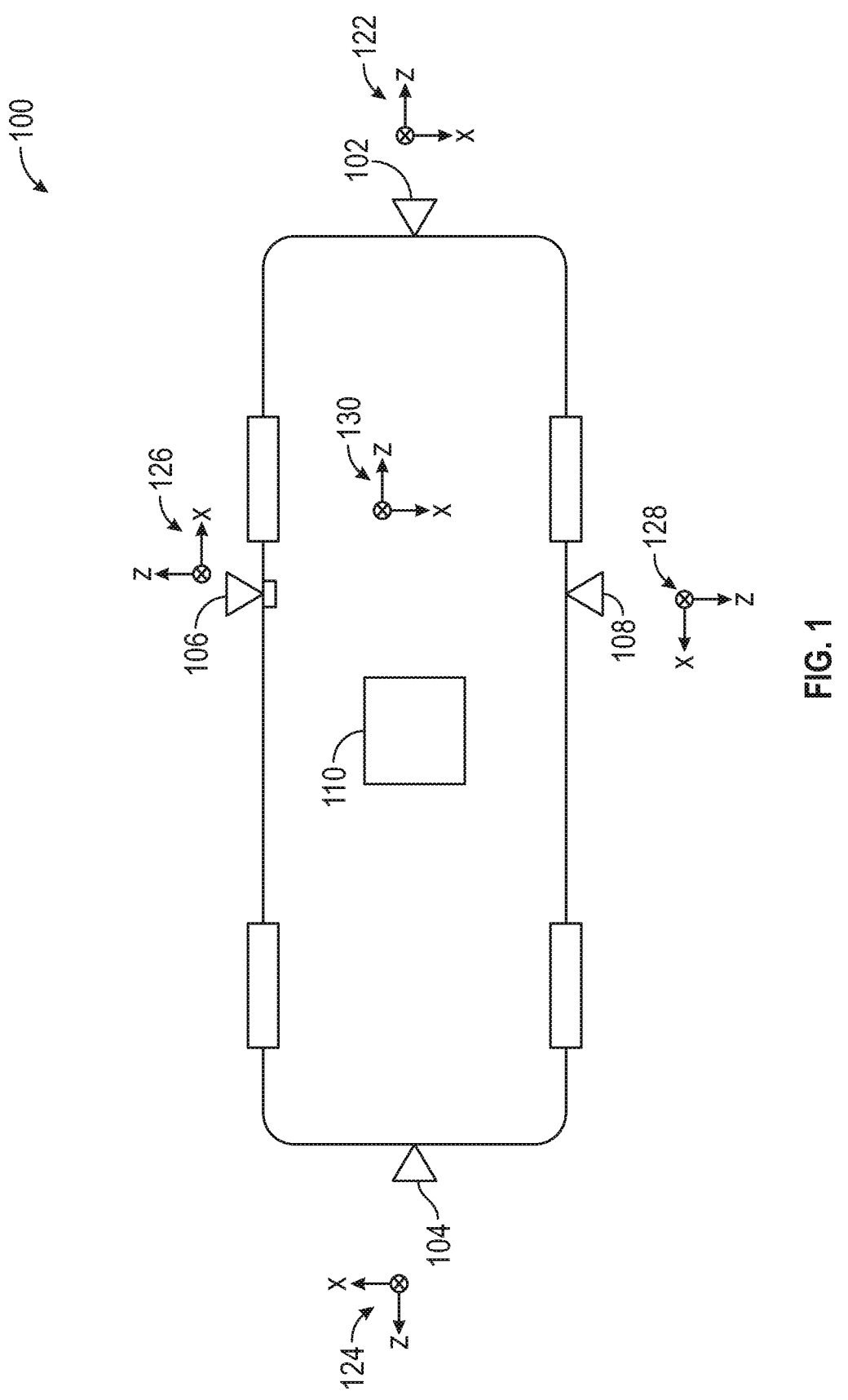
FIG. 1 shows a vehicle schematically in plan view.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows vehicle 100 schematically in plan view. The vehicle 100 can be an autonomous vehicle or a vehicle operating in a suitable cruise control mode. The vehicle 100 includes a front camera 102, a rear camera 104, a left side camera 106 and right side camera 108. The selection of four cameras is for illustrative purposes only. It is understood that any number of cameras can be arranged on the vehicle 100. In various embodiments, the cameras can be wide-angle cameras or fish-eye cameras for which non-linear distortions or optical aberrations occur at the edges of their fields of view.

Each camera has an associated coordinate system that defines a reference frame for the camera. Front coordinate system 122 is associated with front camera 102. Rear coordinate system 124 is associated with rear camera 104. Left coordinate system 126 is associated with left side camera 106. Right coordinate system 128 is associated with right side camera 108. The vehicle 100 can also have an associated vehicle-centered coordinate system 130.

For each camera's coordinate system, the z-axis generally extends away from the camera along the principal axis of the camera and the y-axis points toward the ground. The coordinate systems are right-handed. Thus, for the front camera 102, the x-axis extends to the right of the vehicle, for the rear camera 104, the x-axis extends to the left of the vehicle, for the left side camera 106, the x-axis extends to the front of the vehicle, and for the right side camera 108, the x-axis extends to the rear of the vehicle. The coordinate systems shown in FIG. 1 are for illustrative purposes only. In various embodiments, the axes of the coordinate systems can be selected based on the needs or desires of the manufacturer.

Each camera is in communication with a controller 110 of the vehicle. The controller 110 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 110 may include a non-transitory computer-readable medium that stores instructions which, when processed by one or more processors of the controller 110, implement a method of aligning the coordinate systems of the cameras with each other according to one or more embodiments detailed herein and controlling an operation of the vehicle based on subsequent measurements, such as by trajectory planning and vehicle motion.

Each camera can capture one or more images and send the one or more images to the controller 110 for processing. The controller 110 determines a transformation matrix between reference frames and aligns the coordinate systems of one or more cameras to the vehicle's reference frame. The alignment can be performed by applying the transformation matrix to the coordinate system of one or more cameras. The transformation matrix can be between a coordinate system of a first camera and a coordinate system of a second camera. The controller 110 can then use information based on an object present in images from multiple cameras and as understood through the aligned coordinate systems to perform various operations, such as determining a location of an object in an environment and planning a trajectory with respect to the object.

Figure 2:
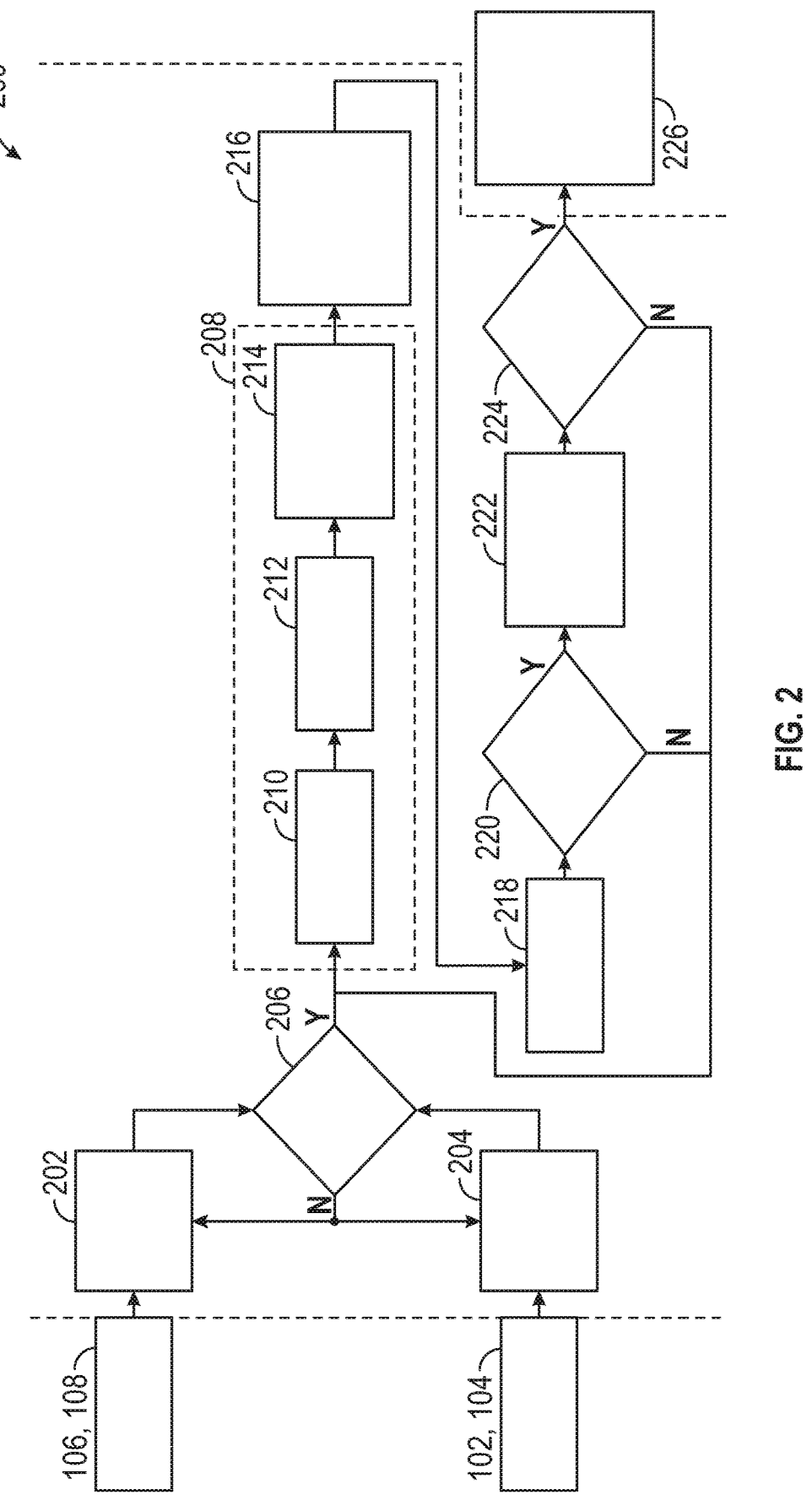
FIG. 2 shows a flowchart of a method of aligning or calibrating a first camera to a second camera, in an illustrative embodiment.

FIG. 2 shows a flowchart 200 of a method of aligning or calibrating a first camera to a second camera, in an illustrative embodiment. The method is not limited to calibration of only two cameras. A camera can have overlapping regions with multiple cameras. Given a set of cameras, each camera having overlapping regions with another camera, the method disclosed herein can calibrate the set of cameras together. In box 202, a first image is captured at a first camera (e.g., one of the left side camera 106 and the right side camera 108). The first image can include a plurality of images captured by the first camera over a selected time interval. In box 204, a second image is captured at a second camera (e.g., one of the front camera 102 and the rear camera 104). The second image can include a plurality of images captured by the second camera over the selected time interval. It is understood that the field of view of the first camera and the field of view of the second camera can include overlapping regions. Therefore, the first image and the second image have regions in common with each other. In box 206, a check is made as to whether the first image and the second image are synchronized, meaning that the first image and the second image are captured by their respective cameras at a same time. If the first image and second image are not synchronized, the method returns to box 202 and box 204 to obtain a new first image and a new second image. However, if the images are synchronized, the method proceeds to a feature pairing operation in box 208.

The feature pairing operation of box 208 includes a region of interest (ROI) extraction operation in box 210, a feature detection operation in box 212 and a ROI and feature matching operation in box 214. In box 210, a region of interest is extracted from both the first image and the second image. The region of interest can be a region from overlapping segments of the first image and the second image. More than one region of interest can be extracted from the first image and second image in box 210. In box 212, features are detected in the first image and the second image. A feature is a piece of information about the content of an image, typically about whether a certain region of the image has certain properties. Features may be specific structures in the image such as points, edges, or objects.

In box 214, the features and the segmented regions are matched to each other. In other words, a first set of features and a first set of segmented regions in the first region of interest in the first image are matched to a second set of features and a set of second segmented regions a second region of interest in the second image. The second region of interest corresponds to the first region of interest. In various embodiments, the method includes performing feature matching using an entire region of interest or using segmented images within the region of interest.

In box 216, a sliding window is applied to the matched features and matched ROIs to select feature pairs for use in computing a transformation matrix between the coordinate system of the first camera and the coordinate system of the second camera. The sliding window selects a number of feature pairs over a time frame according to a criterion. The sliding window moves forward in time to select the most recently identified feature pairs for use in subsequent calculations of the transformation matrix and to remove the oldest features so that they are not used in the calculations of the transformation matrix.

In box 218, the transformation matrix is computed using the selected feature pairs. In box 220, the essential matrix is tested for robustness and accuracy. The essential matrix can be decomposed to obtain calibration parameter (i.e., roll, pitch, yaw) and a translation vector (of size 3×1). If a difference between the calibration parameters of the transformation matrix is greater than a threshold (e.g., a difference in roll angle is greater than 0.5 degrees), the method returns to box 208 to repeat the feature pairing process. Otherwise, the method proceeds to box 222. In box 222, the calibration parameters are maturated by obtaining an average of a plurality of calibration parameters calculated over a selected time period. In various embodiments, the calibration parameter calculations can be accumulated over a long time period, such as for example, 5 minutes, 10 minutes, or 20 minutes. In box 224, a decision is made on whether to publish the maturated calibration parameters. The decision can be based on a stability of the maturated calibration parameters. A maturated calibration parameter is considered stable if a fluctuation, variance, or standard deviation of the maturated calibration parameter is less than a selected threshold. If the maturated calibration parameter is greater than the selected threshold, the method returns to box 208. Otherwise, the method proceeds to box 226. In box 226, the maturated calibration parameter is published for use in downstream applications, such as to control perception operations and/or motion planning operations at the vehicle, autonomous driving operations, advanced driver assistance, etc.

Figure 3:
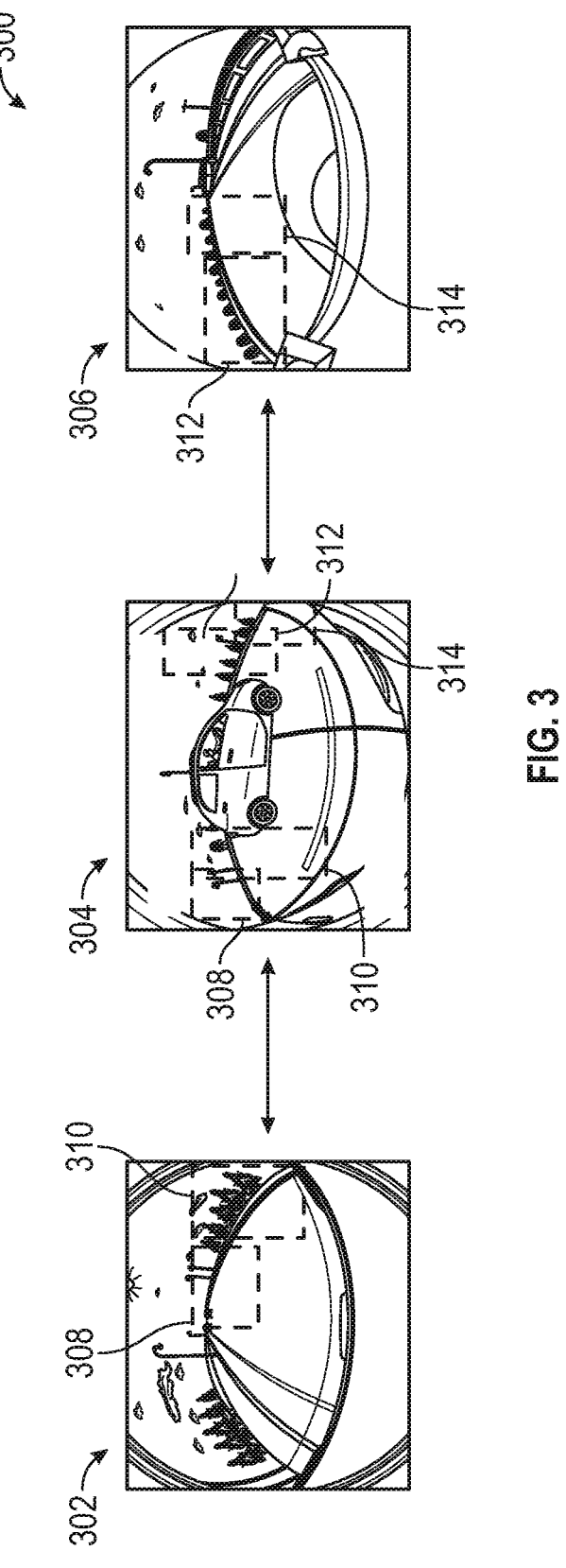
FIG. 3 shows images obtained from various cameras, showing regions of interest therein.

FIG. 3 shows images 300 obtained from various cameras, showing regions of interest therein. The images 300 include a rear image 302 obtained from the rear camera 104, a left side image 304 obtained from the left side camera 106 and a front image 306 obtained from the front camera 102. A first region of interest 308 and a second region of interest 310 are shown in the rear image 302. The first region of interest and second region of interest 310 are also shown in a region of the left side image 304 that overlaps with the rear image 302. Similarly, a third region of interest 312 and a fourth region of interest 314 are shown in the front image 306. The third region of interest 312 and fourth region of interest 314 are also shown in a region of the left side image 304 that overlaps with the front image 306. This method can be performed with any cameras with overlapping fields of view and is not limited to the cameras discussed herein.

Figure 4:
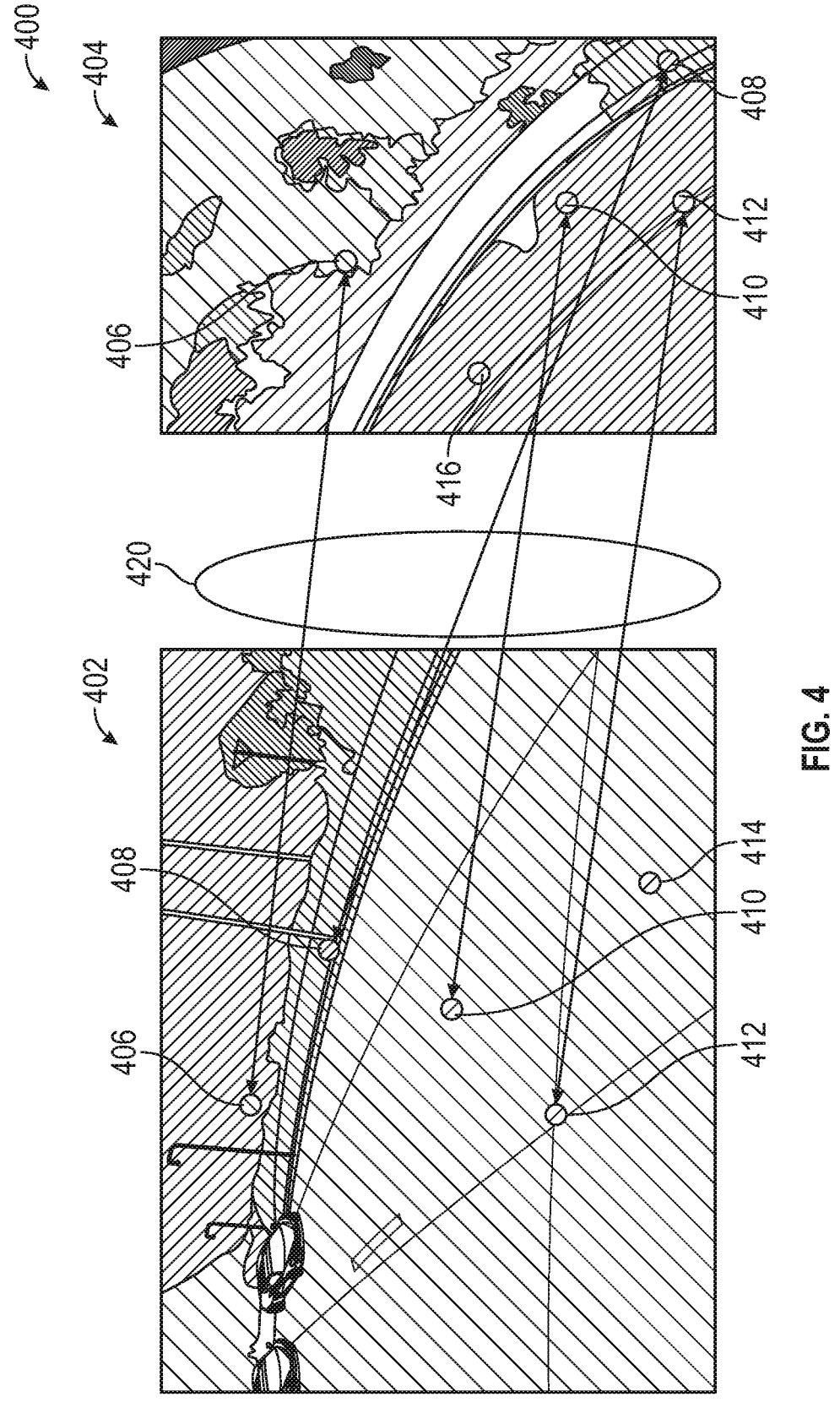
FIG. 4 shows images illustrating the results of a feature matching operation.

FIG. 4 shows images 400 illustrating the results of a feature matching operation. The images 400 include a rear image 402 from a rear camera and a side image 404 from a left side camera. The rear image 402 includes features 406, 408, 410, 412 and 414. Side image 404 includes features 406, 408, 410, 412 and 416. Once identified, the methods disclosed herein are able to match the features 406, 408, 410, and 412 in the rear image 402 to their corresponding features in the side image 404. Lines 420 show the feature pairs between the images. It is noted that not all features may be matched using the feature matching operation. For example, feature 414 in the rear image 402 and feature 416 in the side image 404 have not been matched. It is understood that feature pairs can be identified between any two camera images that have overlapping regions.

Figure 5:
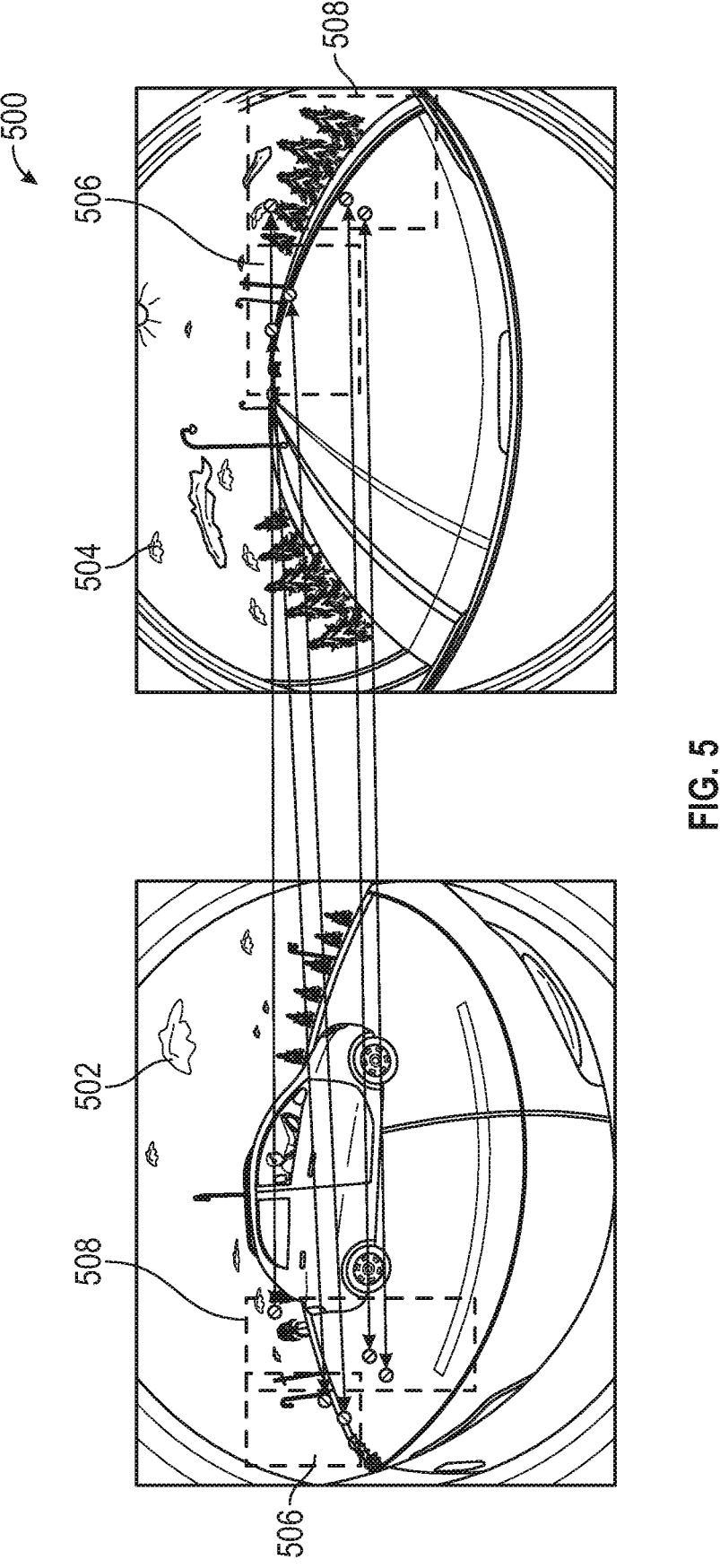
FIG. 5 shows images illustrating a first method of defining a region of interest.

FIG. 5 shows images 500 illustrating a first method of defining a region of interest. In the first method, the regions of interest are preset regions or manually defined regions stored in memory. These preset regions can be retrieved from the memory for subsequent calculations. A side image 502 shows a first preset region 506 and a second preset region 508. The rear image 504 shows the first preset region 506 and the second preset region 508, at their adjusted locations within the rear image 504.

Figure 6:
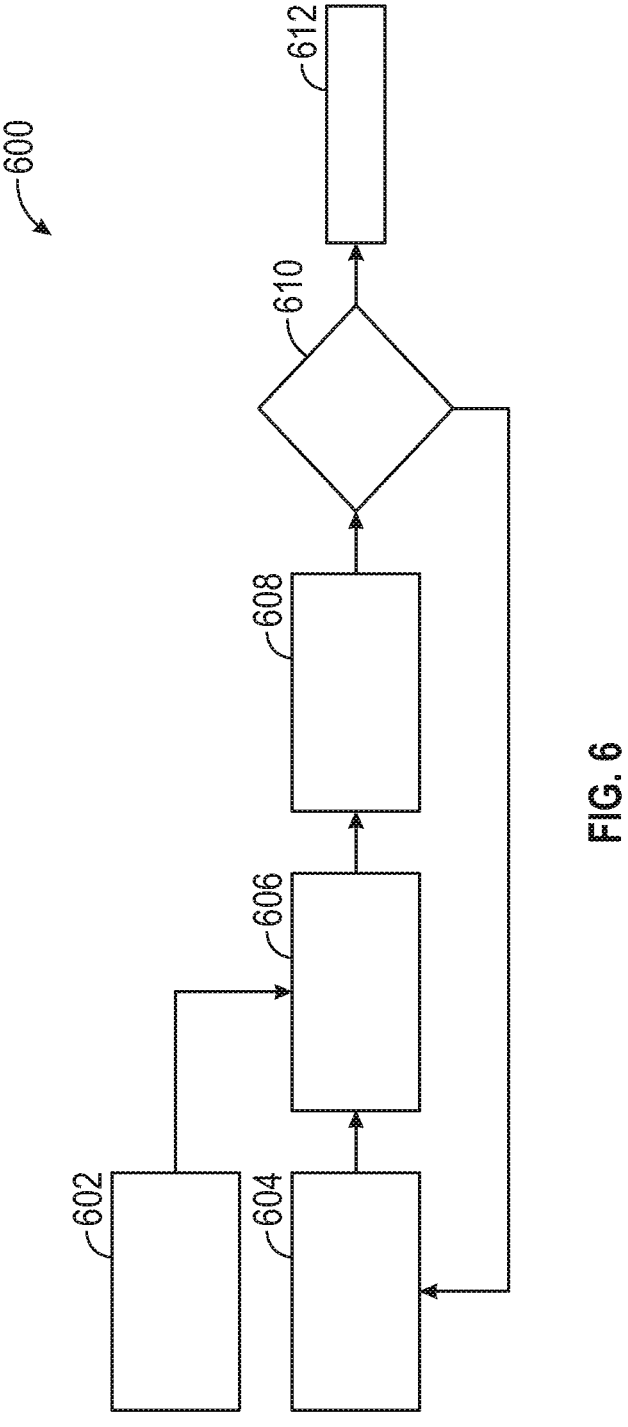
FIG. 6 shows a flowchart of a method for matching segmented regions and features using the preset regions of interest stored in memory.

FIG. 6 shows a flowchart 600 of a method for matching segmented regions and features using the preset regions of interest stored in memory. In box 602 the regions of interest are accessed from memory. In box 604, the images are loaded into a program. In box 606, the regions of interest are used to crop the images. In box 608, feature detection and matching are performed on the features in the cropped images to generate feature pairs. In box 610, the number of feature pairs is compared to feature pair threshold. If the number of feature pairs is less than the feature pair threshold, the method returns to box 604, in which additional images are loaded. Otherwise, the method proceeds to box 612 in which the feature pairs are used in subsequent calculations.

Figure 7:
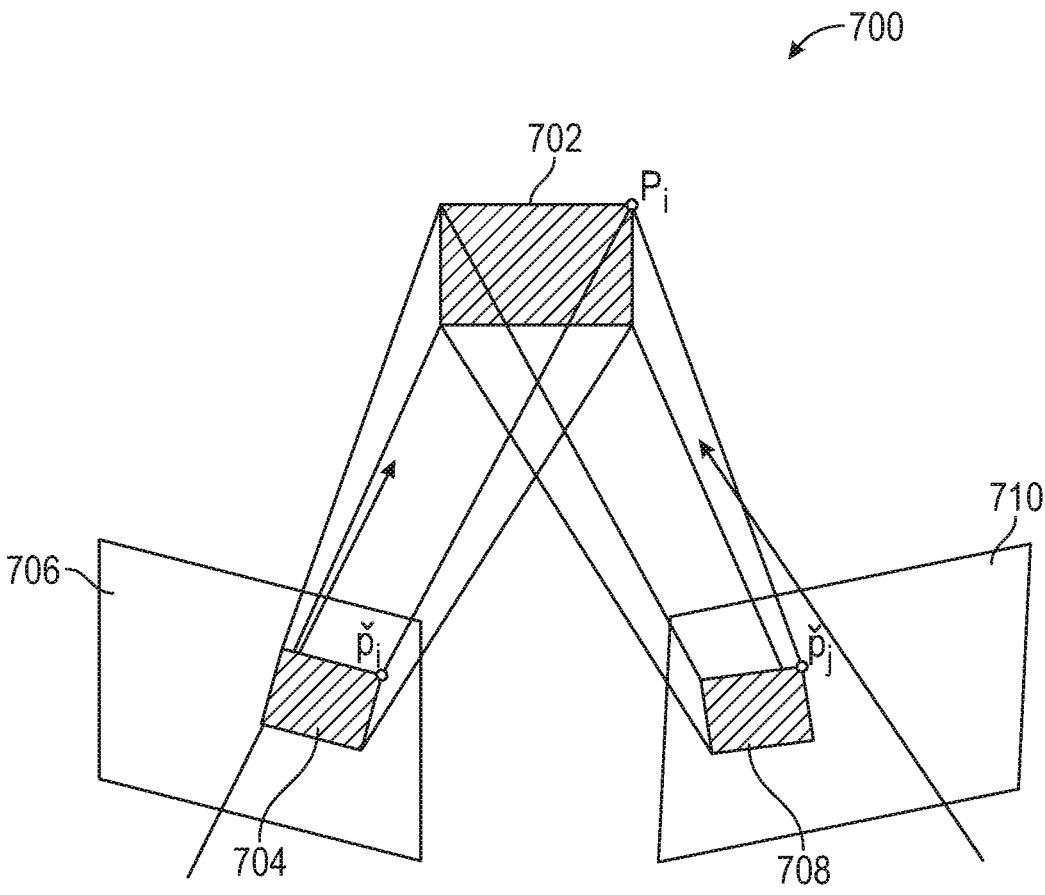
FIG. 7 shows a diagram illustrating a second method of defining a region of interest.

FIG. 7 shows a diagram 700 illustrating a second method of defining a region of interest. A three-dimensional plane or polygon 702 is defined in a volume of space within the fields of view of the first camera and the second camera. Calculations are made to locate a first region of interest 704 in a first frame 706 that corresponds to the three-dimensional plane or polygon 702 and to locate a second region of interest 708 in the second frame 710 that corresponds to the three-dimensional plane or polygon. Thus, the first region of interest 704 and the second region of interest 708 are related to the same region in space.

A vertex $P_i$ of the polygon 702 is related to a pixel location $\check{p}_i$ in the first frame or image by Eq. (1):

$$\check{p}_i = \gamma_i K_{L/R} P_i \qquad \text{Eq. (1)}$$

where $K_{L/R}$ is an intrinsic matrix of the left (or right) camera. Similarly, vertex $P_i$ is related to a pixel location $\check{p}_j$ of the second frame or image by Eq. (2):

$$\check{p}_j = \beta_j K_{F/B}\left(\tfrac{F/B}{L/R} R P_i + \tfrac{F/B}{L/R} t\right) \qquad \text{Eq. (2)}$$

where $K_{F/B}$ is an intrinsic matrix of the front (or back) camera, R is a rotation matrix from the left (right) camera to the front (back) camera and t is a translation matrix from the left (right) camera to the front (back) camera. Solving these equations to remove the vertex $P_i$ results in Eq. (3):

$$\check{p}_j - \beta_j K_{F/B}{}_{L/R}^{F/B} t = \frac{\beta_j}{\gamma_i} K_{F/B}{}_{L/R}^{F/B} R K_{L/R}^{-1} \check{p}_i \qquad \text{Eq. (3)}$$

which therefore relates the first pixel location to the second pixel location. Given the inverse depth for a point in the left/right camera, the corresponding point can be found in the front/rear camera through the homography transformation disclosed in Eqs. (1)-(3). Similarly, for a point in the front/rear camera, a corresponding point can be found in the left/right camera. The polygon can be used to transfer points from the front/rear camera to the left/right camera.

Figure 8:
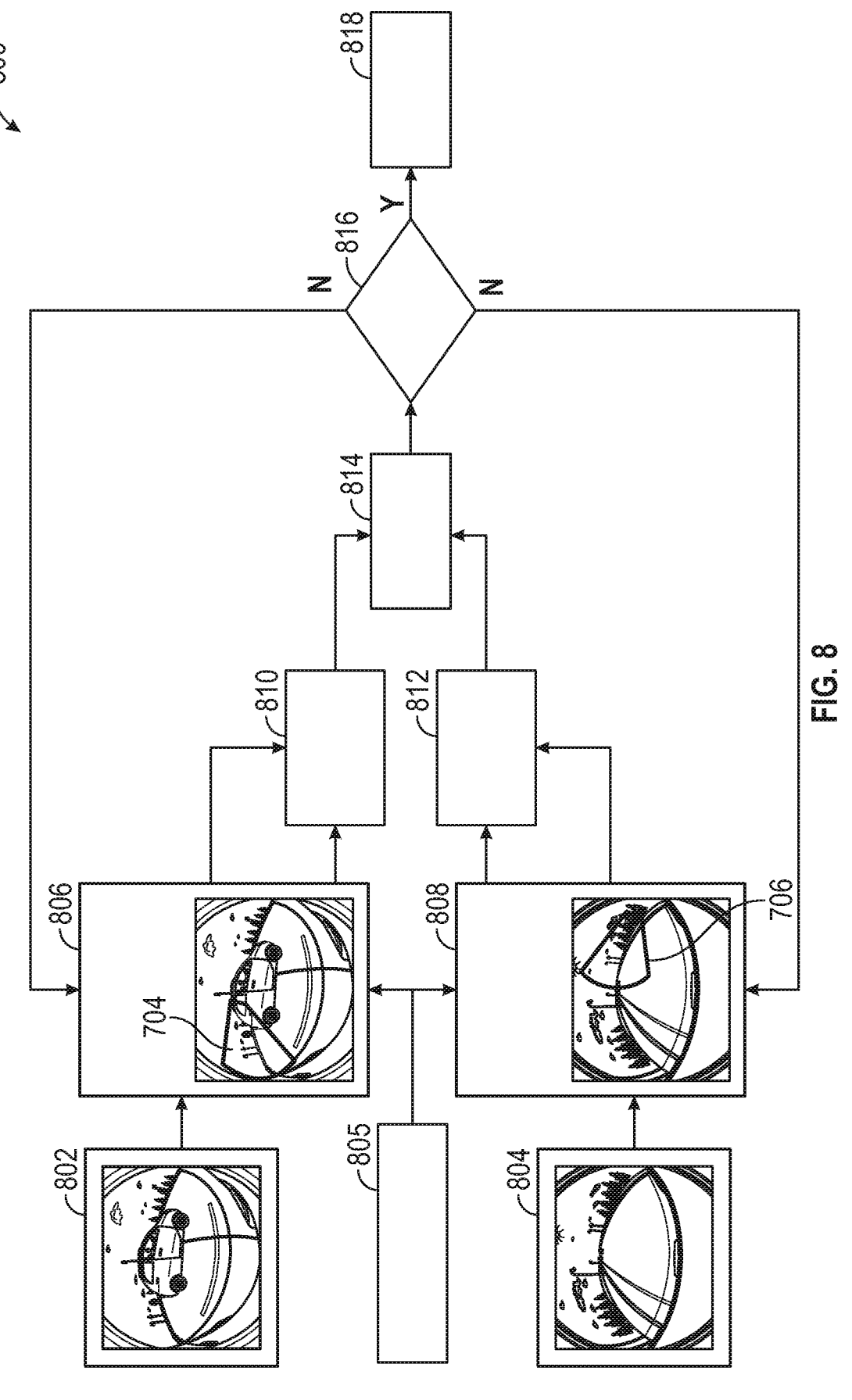
FIG. 8 shows a flowchart of a method for defining regions of interest using the second method shown in FIG. 7.

FIG. 8 shows a flowchart 800 of a method for defining regions of interest using the polygon method shown in FIG. 7. A first image 802 is obtained from a first camera and a second image 804 is obtained from a second camera. In box 805, parameters of a polygon are provided for defining a region of interest. In box 806, a first region of interest 704 is projected onto the first image based on the polygon 702. In box 808, a second region of interest 708 is projected onto the second image based on the polygon 702. In box 810, the first image is cropped using the first region of interest and a first set of features is detected within they first region of

Figure 9:
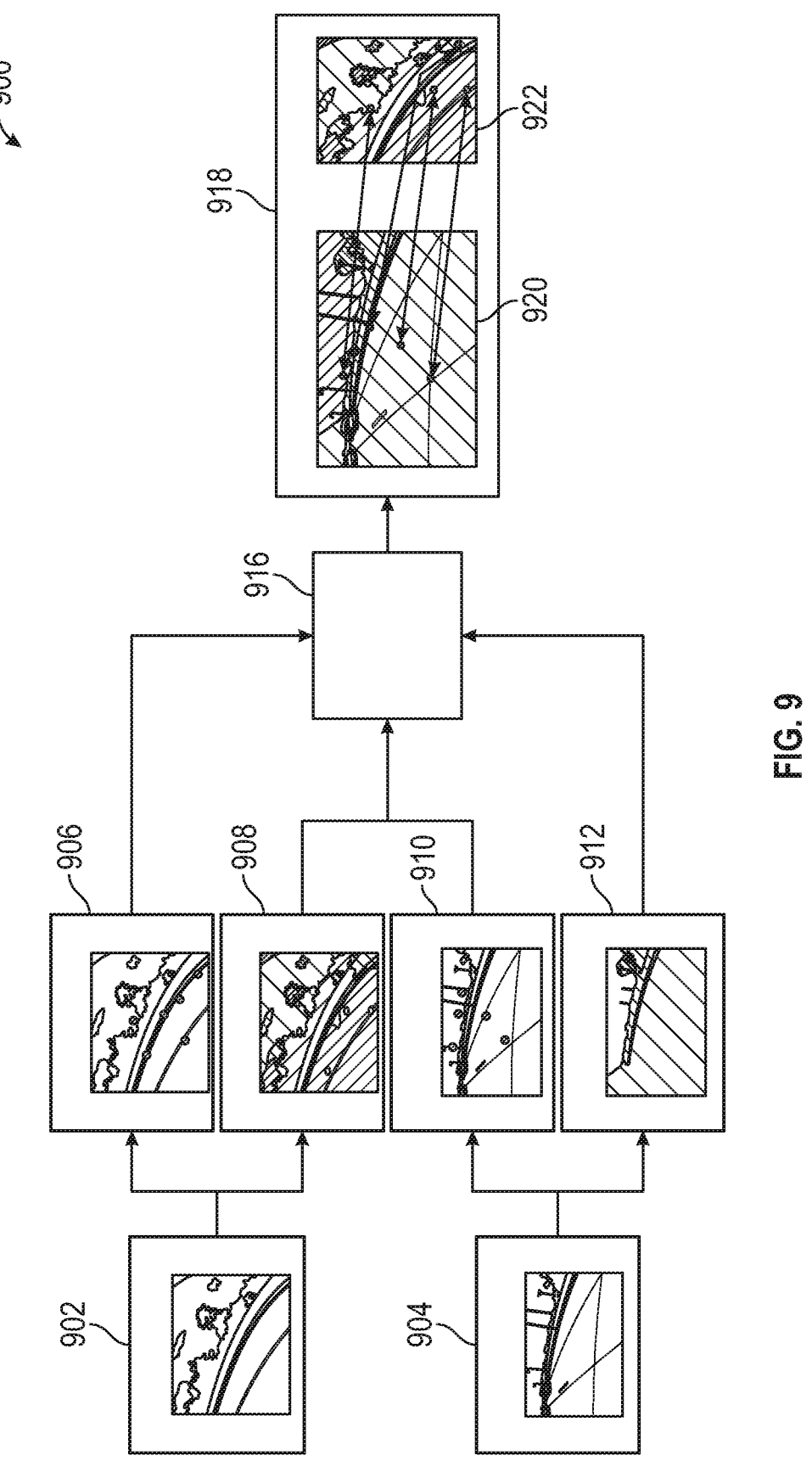
FIG. 9 shows a flowchart illustrating image processing of the feature pairing operation of FIG. 2.

8 interest. In box 812, the second image is cropped using the second region of interest and a second set of features is detected within the second region of interest. In box 814, feature matching is performed to determine feature pairs between the first set of features and the second set of features. In box 816, a check is made to determine if the number of feature pairs is above a selected threshold. If the number of features pairs is less than the selected threshold, the method returns to boxes 806 and 808 in which another set of regions of interest are found in the first image and second image, respectively. Otherwise, the method proceeds to box 818 in which the feature pairs are used in subsequent operations, FIG. 9 shows a flowchart 900 illustrating image processing of the feature pairing operation of FIG. 2. A first cropped image 902 is obtained from a first image from the first camera. The first image can include distortions, such as fish-eye distortions, etc. The first cropped image 902 can be obtained by selecting pixels within a region of interest of the first image. A second cropped image 904 is obtained for a second image from the second camera. The second image can also include distortions is similarly cropped to isolate regions of little or no distortions. The second cropped image 904 can be obtained by selecting pixels within a second region of interest of the second image. The first regions of interest and the second region of interest correspond to a same region in space.

The first cropped image 902 is processed using feature detection to locate a first set of features therein, resulting in a first feature detection image 906. The first cropped image 902 is also processed using image segmentation to identify a first set of segmented regions in the first cropped image. A segmented region includes pixels belonging to a same group or category (i.e., road, sky, etc.). This results in a first segmented image 908.

The second cropped image 904 is processed using feature detection to locate a second set of features therein, resulting in a second feature detection image 910. The second cropped image 904 is also processed using image segmentation to identify a second set of segmented regions in the second cropped image that belong to the same group or category. This results in a second segmented image 912.

The first feature detection image 906, first segmented image 908, second feature detection image 910 and second segmented image 912 are input to a matching algorithm 916. In an embodiment, the matching algorithm 916 establishes a cost function and performs an optimization operation on the cost function. The optimization operation matches segmented regions in order to minimize various parameters of the feature pairs, including a difference in their descriptors (i.e., a descriptor distance), a difference in their colors and a difference in a number of feature pairs in a segmented region. Each feature includes a vector descriptor that indicates the type of feature and which can be used to match the features. An illustrative optimization process is shown in Eq. (4):

$$\min \sum_{i \in A} \sum_{j \in B} [w_1 C_d(p_i, p_j) + w_2 C_c(p_i, p_j) + w_3 C_n(p_i, p_j)] \qquad \text{Eq. (4)}$$

where A/B is the set of features belonging to the same categories in the first and second images, $p_i$ is a feature in set A of the first image, $p_j$ is a feature in set B of the second image, $C_d$ represents a cost related to a distance between descriptors of a feature pair, $C_c$ represents a color difference between two features, $C_n$ is a voting score for the number of features in the same set, and $w_1$, $w_2$ and $w_3$ are weighting factors. Images 918 shows feature pairs between a first image 920 and a second image 922 that have been determined using the optimization process of Eq. (4). Minimizing the cost function results in features pairs and matching segmented regions.

Figure 10:
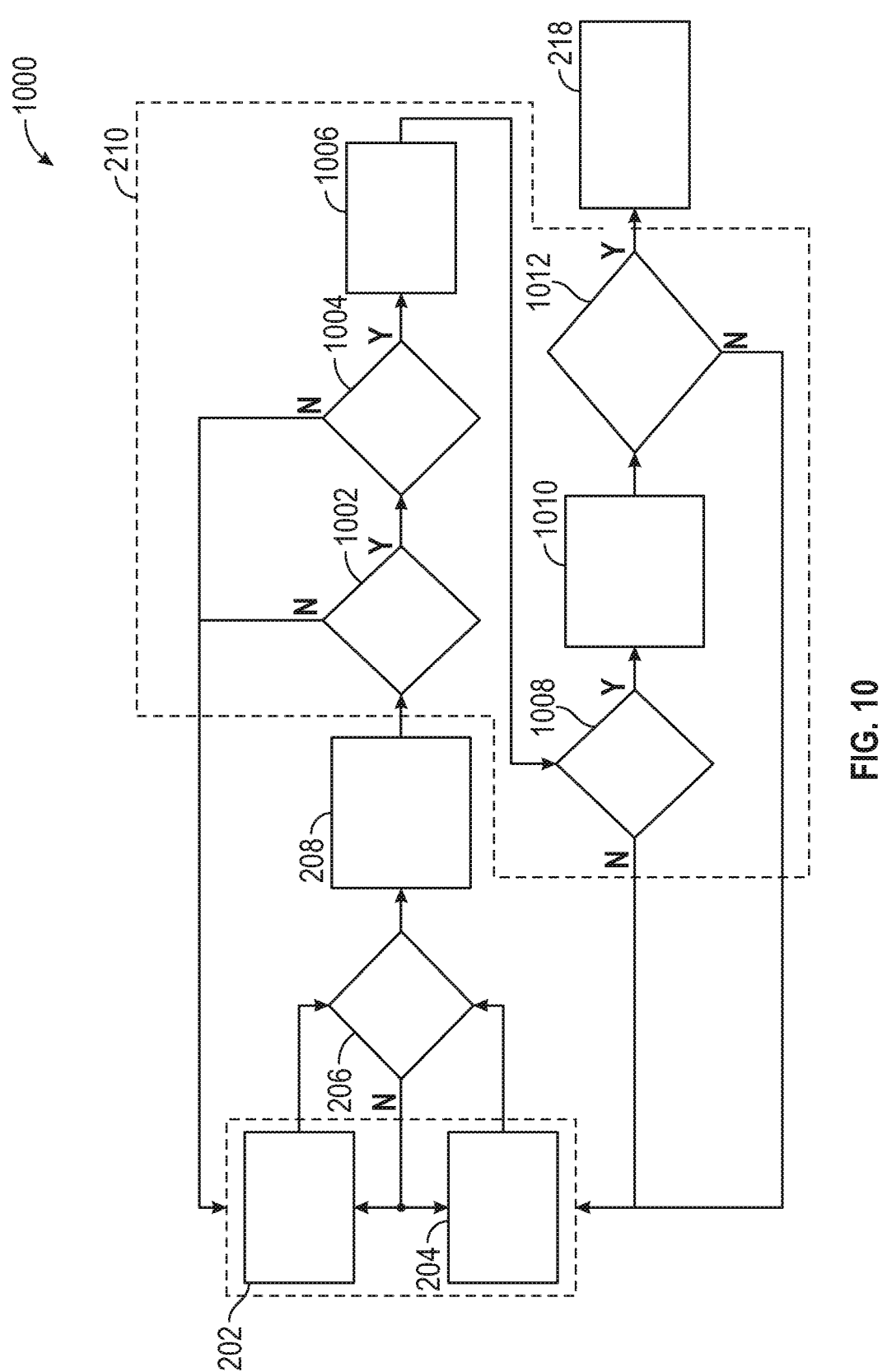
FIG. 10 shows a flowchart of a method for using a sliding window to create a transformation matrix.

FIG. 10 shows a flowchart 1000 of a method for using a sliding window to create a transformation matrix (i.e., the method of box 216, FIG. 2). Boxes 202, 204, 206, 208 and 218 from FIG. 2 are shown for purposes of context. In box 1002, the number of frames collected is compared to frame threshold. If the number of frames is less than the frame threshold, the method returns obtain additional frames (boxes 202, 204). If the number of frames equals or exceeds a frame threshold, the method proceeds to box 1004. In box 1004, the number of matched features (or feature pairs) is compared to a matched feature threshold. If the number of matched features is less than a matched feature threshold, the method returns to obtain additional frames (boxes 202, 204). If the number of matched features is equal to or exceeds the matched feature threshold, the method proceeds to box 1006. In box 1006, matched features are accumulated or stored into a queue. In box 1008, the remaining capacity of the queue is checked. If the queue is not full, the method returns to the obtain additional frames (boxes 202, 204). If the queue is full, the method proceeds to box 1010.

In box 1010, the matched features are retrieved from the queue using a sliding window that keeps the most recently matched pairs and removes or deletes the oldest matched pairs. In box 1012, the matched features selected by the sliding window are checked for quality. Each feature pair is marked as either an inlier or an outlier. If the ratio of inliers to outliers is greater than a selected number or value, the method proceeds to box 218 to compute the transformation matrix with the inlier pairs.

In box 218, the transformation matrix can be calculated using the matched feature pairs. The transformation matrix can be calculated using feature pairs between a first image and a second image or can be calculated using feature pairs between more than two images. An optimization process can be used to determine the transformation matrix over a number n of frames, such as shown in Eq. (5):

$$\min \frac{1}{n} \sum_{i=1}^{n} \left\| \check{p}_i \, E \, \check{q}_j \right\| \qquad \text{Eq. (5)}$$

where $\check{p}_i$ is the pixel location of a feature in a frame from the first camera, $\check{q}_j$ is the pixel location of the feature in a frame from the second camera, E is the transformation matrix between the first frame and the second frame and n is the number of frames.

In one embodiment, the optimization process can use a non-linear least square method. An illustrative expansion of Eq. (5) with respect to side cameras and a front camera is shown in Eq. (6):

$$_F^{L/R}T = \arg\,\min \sum_j \sum_i w_j \left\| \check{p}_i \left[ _F^{L/R} t \right]_x {}_F^{L/R} R \check{q}_i \right\| \qquad \text{Eq. (6)}$$

where L stands for the left side camera, R stands for the right side camera, and F stands for the front camera. Thus, $$_F^{L/R}T$$

represents a transformation matrix between either the left side camera or the right side camera and the front camera. Coefficient $w_j$ is a weight factor for different feature pairs from different cameras, $$\left[ _F^{L/R} t \right]_x$$

is a skew symmetric matrix of the translation vector $$_F^{L/R} t$$

between the first (side) camera and the second (front) camera and $$_F^{L/R} R$$

is a rotation matrix between the first (side) camera and the second (side) camera. An equation similar to Eq. (3) can be used to determine the transformation matrix between the side cameras and a rear camera.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of aligning a first camera of a vehicle with a second camera of the vehicle, comprising:

detecting a first set of features in a first image obtained from the first camera;

detecting a second set of features in a second image obtained from the second camera;

determining a first region of interest in the first image; determining a second region of interest in the second image;

generating a feature pair by minimizing a cost function based on the first set of features, the second set of features, the first region of interest and the second region of interest, wherein minimizing the cost function includes minimizing a descriptor distance for the feature pair, a difference in color of a first pixel in the first image and a second pixel in the second image, the first pixel and the second pixel associated with the feature pair, and a difference in a number of features in a given segmented region of the first region of interest and the second region of interest;

aligning the first camera with the second camera using the feature pair; and controlling an operation at the vehicle based on the alignment between the first camera and the second camera.

2. The method of claim 1, further comprising determining a transformation matrix between the first camera and the second camera using the feature pairs.

3. The method of claim 1, further comprising storing the feature pair in a queue and retrieving the feature pair from the queue using a sliding window.

4. The method of claim 1, further comprising defining the first region of interest in the first image and the second region of interest in the second image, the first region of interest corresponding to the second region of interest, detecting the first set of features and determining a first set of segmented regions within the first region of interest, and detecting the second set of features and determining a second set of segmented regions within the second region of interest.

5. The method of claim 4, wherein defining the first region of interest and the second region of interest includes one of: (i) retrieving the first region of interest and the second region of interest from memory, wherein the first region of interest and the second region of interest are manually defined; (ii) defining a polygon in a volume of space, and locating the first region of interest in the first image and the second region of interest in the second image based on the polygon; (iii) defining the first region of interest in the first image and obtaining the second region of interest in the second image using a homography transformation; and (iv) defining at least one of the first region of interest and the second region of interest by selecting a segmentation region.

6. A system for aligning a first camera of a vehicle with a second camera of the vehicle, comprising:

a processor configured to:

detect a first set of features in a first image obtained from the first camera;

detect a second set of features in a second image obtained from the second camera;

determine a first region of interest in the first image;

determine a second region of interest in the second image;

generate a feature pair by minimizing a cost function based on the first set of features, the second set of features, the first region of interest and the second region of interest, wherein minimizing the cost function includes minimizing a descriptor distance for the feature pair, a difference in color of a first pixel in the first image and a second pixel in the second image, the first pixel and the second pixel associated with the feature pair, and a difference in a number of features in a given segmented region of the first region of interest and the second region of interest;

align the first camera with the second camera using the feature pair; and control an operation at the vehicle based on the alignment between the first camera and the second camera.

7. The system of claim 6, wherein the processor is further configured to determine a transformation matrix between the first camera and the second camera using the feature pairs.

8. The system of claim 6, wherein the processor is further configured to store the feature pair in a queue and retrieve the feature pair from the queue using a sliding window.

9. The system of claim 6, wherein the processor is further configured to define the first region of interest in the first image and the second region of interest in the second image, the first region of interest corresponding to the second region of interest, detect the first set of features and determining a first set of segmented regions within the first region of interest, and detect the second set of features and determining a second set of segmented regions within the second region of interest.

10. The system of claim 9, wherein the processor is further configured to define the first region of interest and the second region of interest by performing one of: (i) retrieving the first region of interest and the second region of interest from memory, wherein the first region of interest and the second region of interest are manually defined; (ii) defining a polygon in a volume of space, and locating the first region of interest in the first image and the second region of interest in the second image based on the polygon; (iii) defining the first region of interest in the first image and obtaining the second region of interest in the second image using a homography transformation; and (iv) defining at least one of the first region of interest and the second region of interest by selecting a segmentation region.

11. A vehicle, comprising:

a first camera;

a second camera; and a processor configured to:

detect a first set of features in a first image obtained from the first camera;

detect a second set of features in a second image obtained from the second camera;

determine a first region of interest in the first image;

determine a second region of interest in the second image;

generating a feature pair by minimizing a cost function based on the first set of features, the second set of features, the first region of interest and the second region of interest, wherein minimizing the cost function includes minimizing a descriptor distance for the feature pair, a difference in color of a first pixel in the first image and a second pixel in the second image, the first pixel and the second pixel associated with the feature pair, and a difference in a number of features in a given segmented region of the first region of interest and the second region of interest;

align the first camera with the second camera using the feature pair; and control an operation at the vehicle based on the alignment between the first camera and the second camera.

12. The vehicle of claim 11, wherein the processor is further configured to determine a transformation matrix between the first camera and the second camera using the feature pairs.

13. The vehicle of claim 11, wherein the processor is further configured to store the feature pair in a queue and retrieve the feature pair from the queue using a sliding window.

14. The vehicle of claim 11, wherein the processor is further configured to define the first region of interest in the first image and the second region of interest in the second image, the first region of interest corresponding to the second region of interest, detect the first set of features and determine a first set of segmented regions within the first region of interest, and detect the second set of features and determining a second set of segmented regions within the second region of interest.

15. A method of aligning a first camera of a vehicle with a second camera of the vehicle, comprising:

detecting a first set of features in a first image obtained from the first camera;

detecting a second set of features in a second image obtained from the second camera;

determining a first region of interest in the first image;

determining a second region of interest in the second image;

generating a feature pair by minimizing a cost function based on the first set of features, the second set of features, the first region of interest and the second region of interest, wherein minimizing the cost function includes minimizing a descriptor distance for the feature pair and a difference in a number of features in a given segmented region of the first region of interest and the second region of interest;

aligning the first camera with the second camera using the feature pair; and controlling an operation at the vehicle based on the alignment between the first camera and the second camera.

16. A system for aligning a first camera of a vehicle with a second camera of the vehicle, comprising:

a processor configured to:

detect a first set of features in a first image obtained from the first camera;

detect a second set of features in a second image obtained from the second camera;

determine a first region of interest in the first image;

determine a second region of interest in the second image;

generate a feature pair by minimizing a cost function based on the first set of features, the second set of features, the first region of interest and the second region of interest, wherein minimizing the cost function includes minimizing a descriptor distance for the feature pair and a difference in a number of features in a given segmented region of the first region of interest and the second region of interest;

align the first camera with the second camera using the feature pair; and control an operation at the vehicle based on the alignment between the first camera and the second camera.

17. A vehicle, comprising:

a first camera;

a second camera; and a processor configured to:

detect a first set of features in a first image obtained from the first camera;

detect a second set of features in a second image obtained from the second camera;

determine a first region of interest in the first image;

determine a second region of interest in the second image;

generating a feature pair by minimizing a cost function based on the first set of features, the second set of features, the first region of interest and the second region of interest, wherein minimizing the cost function includes minimizing a descriptor distance for the feature pair and a difference in a number of features in a given segmented region of the first region of interest and the second region of interest;

align the first camera with the second camera using the feature pair; and control an operation at the vehicle based on the alignment between the first camera and the second camera.

18. The method of claim 2, further comprising decomposing the transformation matrix to obtain a calibration parameter.

19. The system of claim 7, wherein the processor is further configured to decompose the transformation matrix to obtain a calibration parameter.

20. The vehicle of claim 12, wherein the processor is further configured to decompose the transformation matrix to obtain a calibration parameter.

\* \* \* \* \*